United States Patent
Harper et al.

(10) Patent No.: US 9,626,993 B2
(45) Date of Patent: Apr. 18, 2017

(54) ACTUATOR COIL TEMPERATURE ESTIMATION USING SKEW VALUES

(71) Applicant: International Business Machines Corporation, Armonk, NY (US)

(72) Inventors: David H. F. Harper, Vail, AZ (US); Randy C. Inch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/856,403

(22) Filed: Sep. 16, 2015

(65) Prior Publication Data

US 2017/0076746 A1    Mar. 16, 2017

(51) Int. Cl.
*G11B 20/20* (2006.01)
*G11B 5/48* (2006.01)

(52) U.S. Cl.
CPC .................................. *G11B 5/4893* (2013.01)

(58) Field of Classification Search
None
See application file for complete search history.

(56) References Cited

U.S. PATENT DOCUMENTS

| | | | |
|---|---|---|---|
| 4,101,937 A * | 7/1978 | Jenkins | G11B 5/00826 360/76 |
| 5,184,257 A | 2/1993 | Koga et al. | |
| 6,369,972 B1 | 4/2002 | Codilian et al. | |
| 8,035,926 B2 | 10/2011 | Harper | |
| 8,188,696 B2 * | 5/2012 | Shimizu | H02P 6/14 318/400.29 |
| 2002/0101682 A1 | 8/2002 | Francis et al. | |
| 2004/0240101 A1 | 12/2004 | Inaji et al. | |
| 2011/0216437 A1 | 9/2011 | Mathur et al. | |

FOREIGN PATENT DOCUMENTS

| | | |
|---|---|---|
| WO | 9420992 A1 | 9/1994 |
| WO | 2008101996 A1 | 8/2008 |

OTHER PUBLICATIONS

Kianzad et. al., "Nylon coil actuator operating temperature range and stiffness," Proceedings of SPIE, vol. 9430, Apr. 29, 2015, pp. 1-6.

* cited by examiner

*Primary Examiner* — K. Wong
(74) *Attorney, Agent, or Firm* — Zilka-Kotab, PC

(57) ABSTRACT

A computer program product according to one embodiment includes a computer readable storage medium having program instructions embodied therewith, the program instructions executable by a controller of a data storage device to cause the controller to perform a method including, determining, by the controller, a test skew gain of a coil using skew information from a servo subsystem of the controller; comparing, by the controller, the test skew gain to a stored reference gain; and taking an action, by the controller, in response to the comparing of the test skew gain to the reference gain.

20 Claims, 14 Drawing Sheets

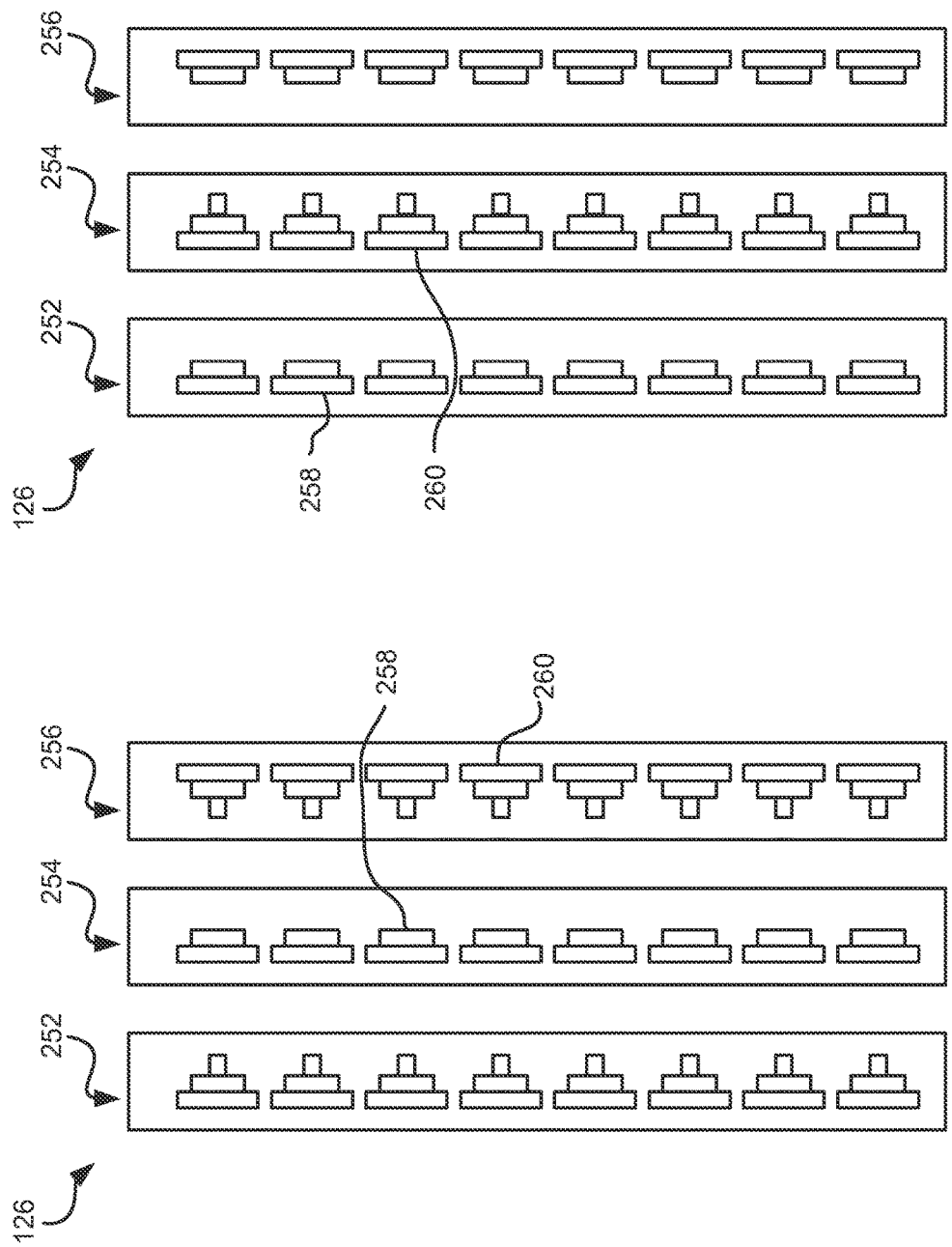

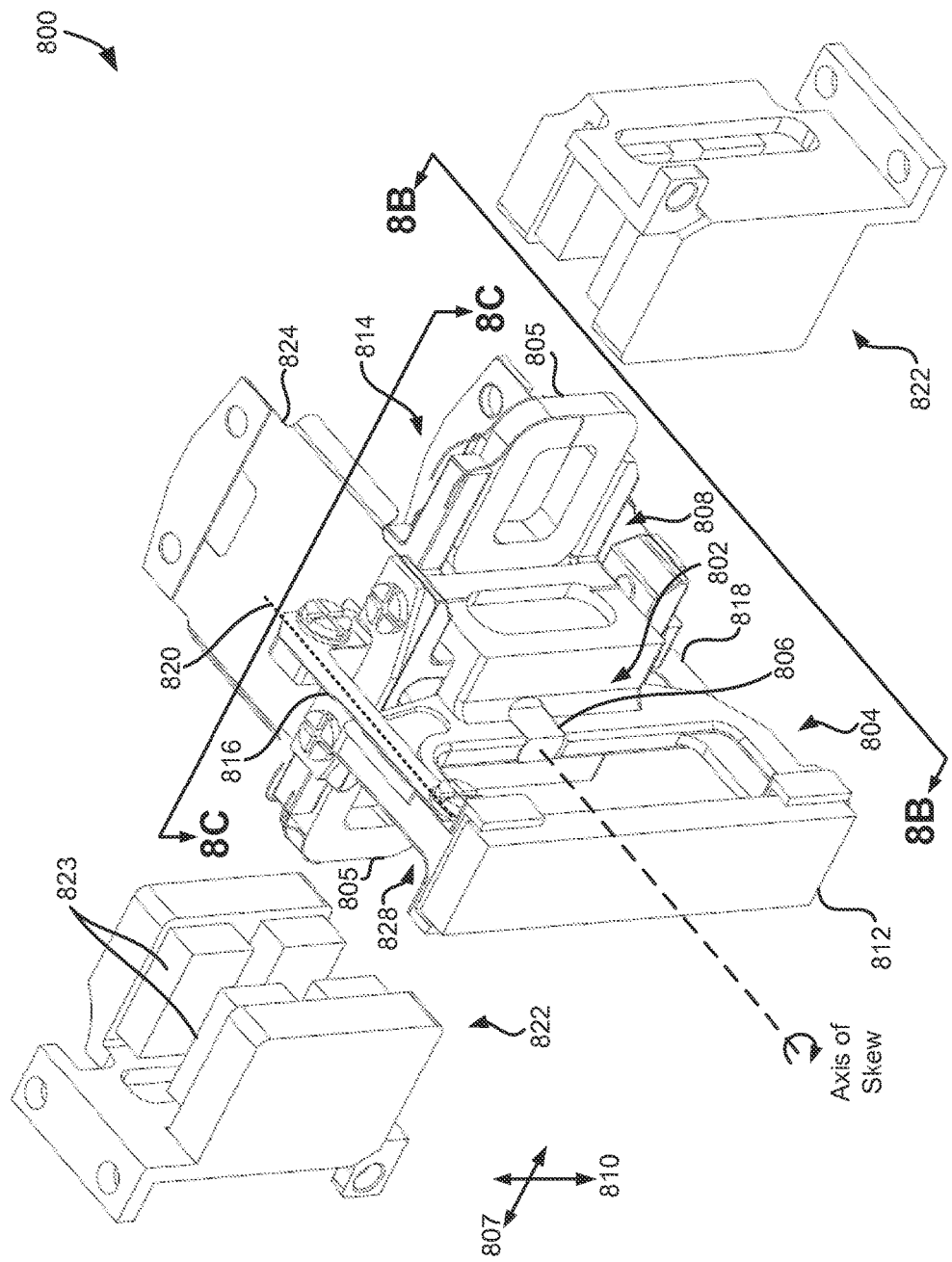

ACTUATOR COIL TEMPERATURE ESTIMATION USING SKEW VALUES

BACKGROUND

The present invention relates to data storage systems, and more particularly, this invention relates to temperature estimation in actuator mechanisms, e.g., in data storage systems such as tape drives, and use thereof, e.g., for thermal stress prevention.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A computer program product according to one embodiment includes a computer readable storage medium having program instructions embodied therewith, the program instructions executable by a controller of a data storage device to cause the controller to perform a method including, determining, by the controller, a test skew gain of a coil using skew information from a servo subsystem of the controller, comparing, by the controller, the test skew gain to a stored reference gain; and taking an action, by the controller, in response to the comparing of the test skew gain to the reference gain.

An apparatus according to another embodiment includes a controller configured to determine, by the controller, a test skew gain of a coil using skew information from a servo subsystem thereof; compare, by the controller, the test skew gain to a stored reference gain; and take an action, by the controller, in response to the comparing of the test skew gain to the reference gain.

An apparatus according to yet another embodiment includes determining a test skew gain of a coil in a data storage device using skew information from a servo subsystem of a controller, comparing the test skew gain to a stored reference gain for determining whether a temperature of the coil is elevated, and stopping the data storage device in response to the comparing of the test skew gain to the reference gain indicating that the temperature of the coil is elevated.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8A is an exploded partial perspective view of an apparatus according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof.

In one general embodiment, a computer program product includes a computer readable storage medium having program instructions embodied therewith, the program instructions executable by a controller of a data storage device to cause the controller to perform a method including, determining, by the controller, a test skew gain of a coil using skew information from a servo subsystem of the controller; comparing, by the controller, the test skew gain to a stored reference gain; and taking an action, by the controller, in response to the comparing of the test skew gain to the reference gain.

In another general embodiment, an apparatus includes a controller configured to determine, by the controller, a test skew gain of a coil using skew information from a servo subsystem thereof; compare, by the controller, the test skew gain to a stored reference gain; and take an action, by the controller, in response to the comparing of the test skew gain to the reference gain.

In yet another general embodiment, an apparatus includes determining a test skew gain of a coil in a data storage device using skew information from a servo subsystem of a controller, comparing the test skew gain to a stored reference gain for determining whether a temperature of the coil is elevated, and stopping the data storage device in response to the comparing of the test skew gain to the reference gain indicating that the temperature of the coil is elevated.

Figure 1A:
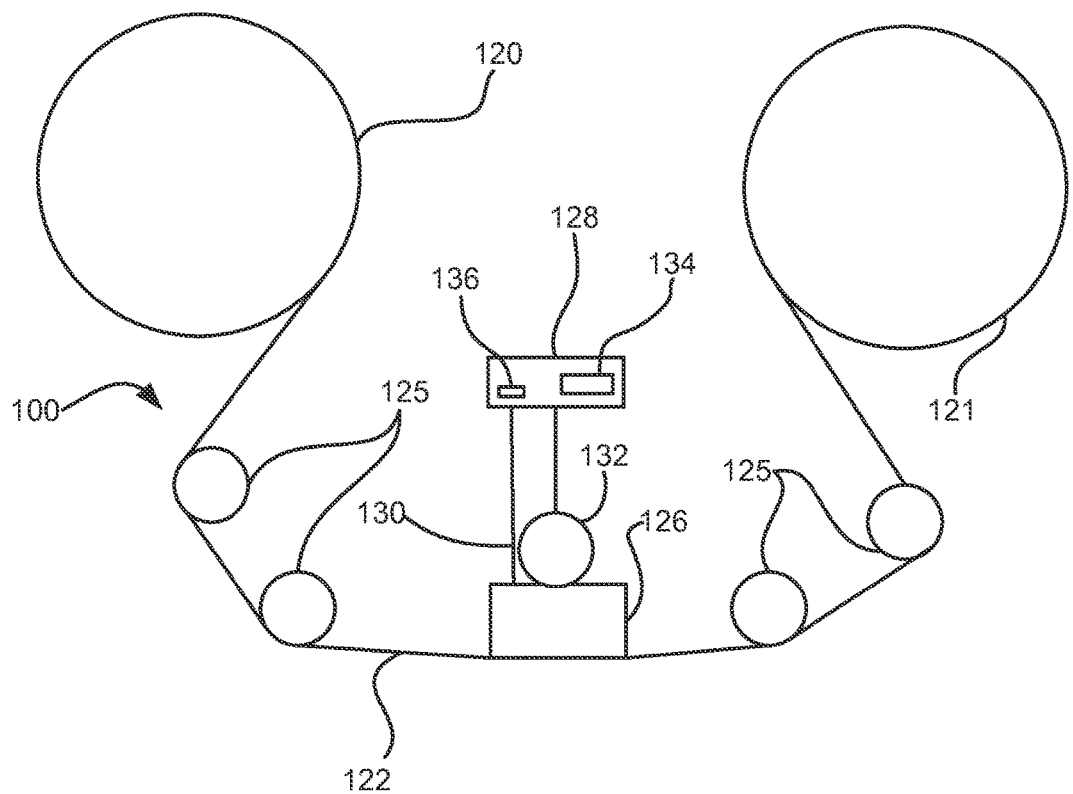
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
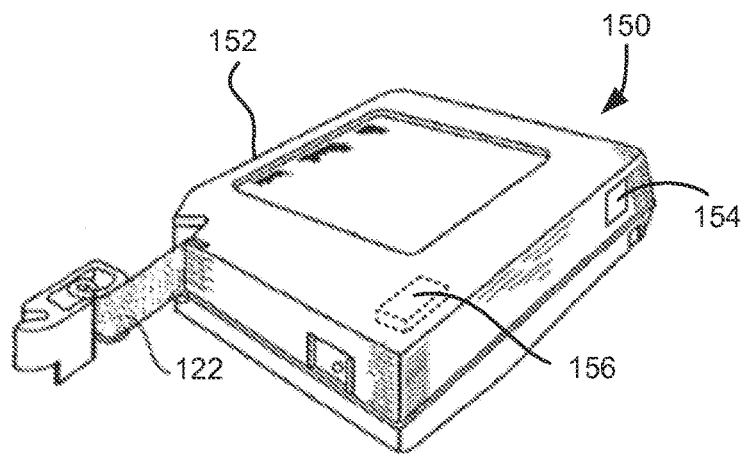
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
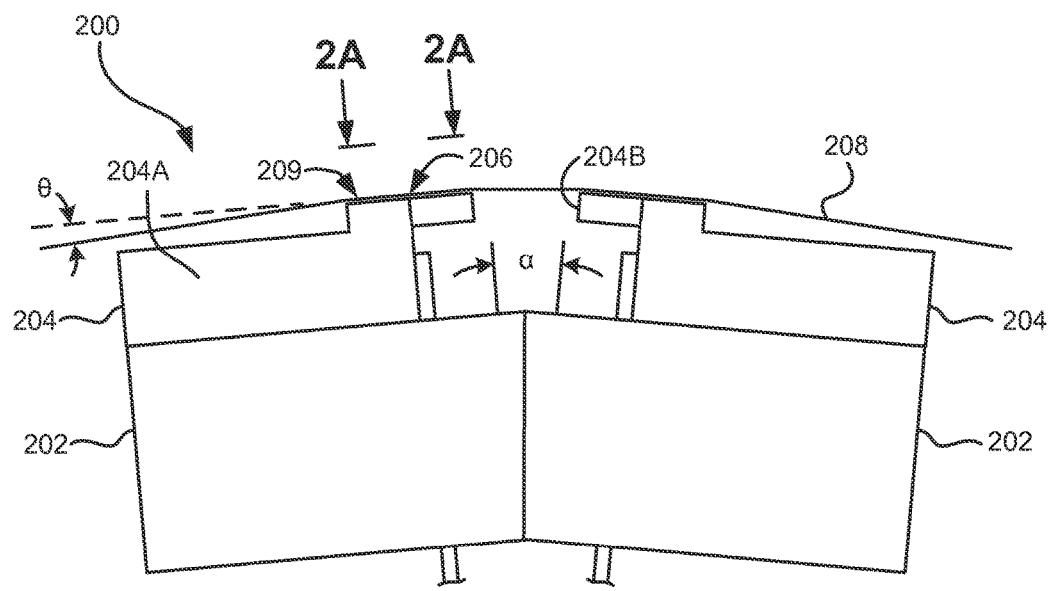
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
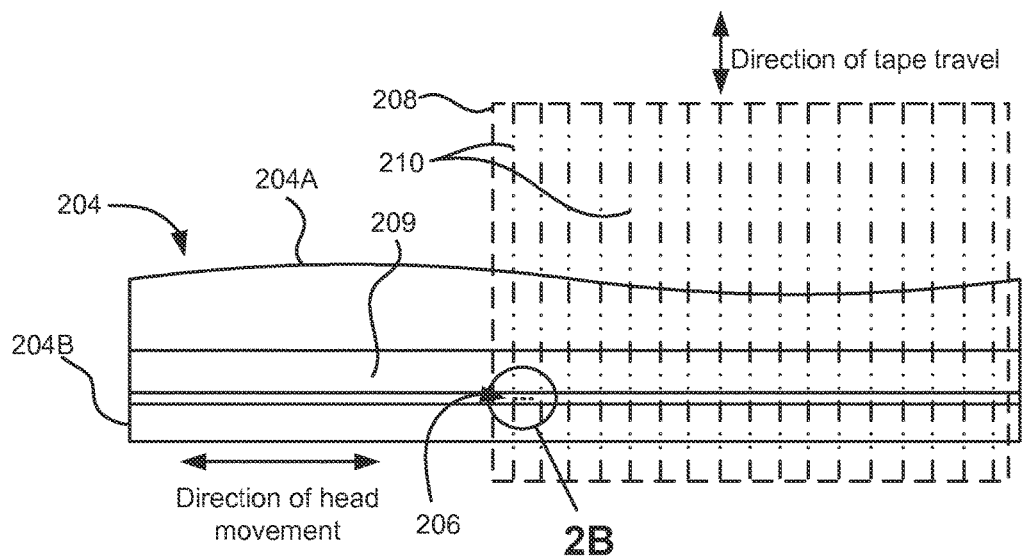
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
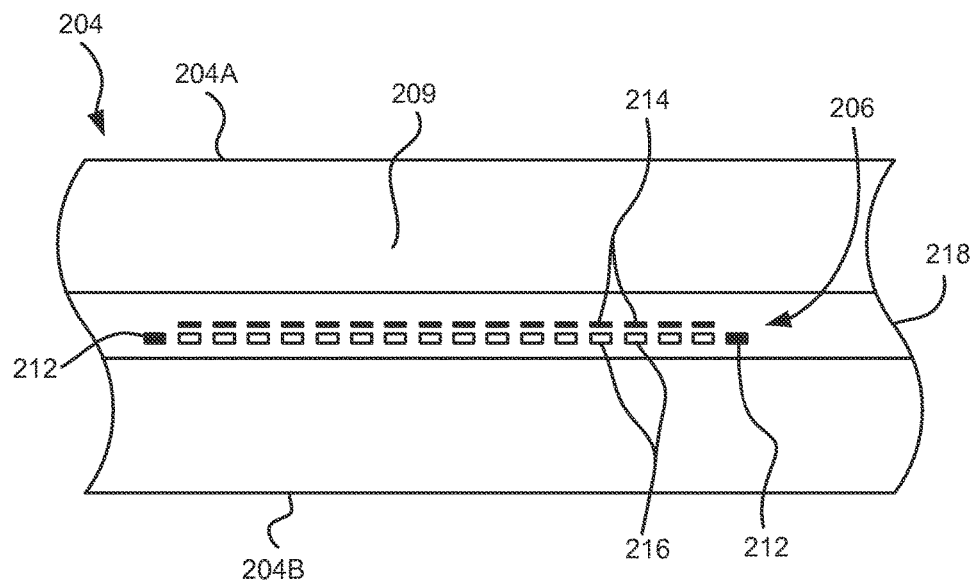
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
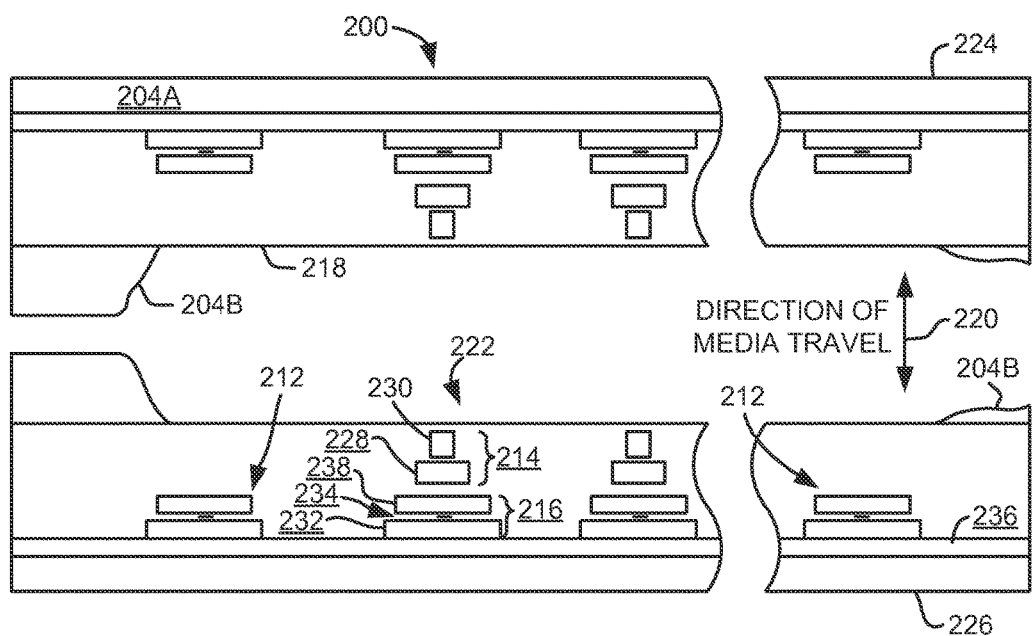
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
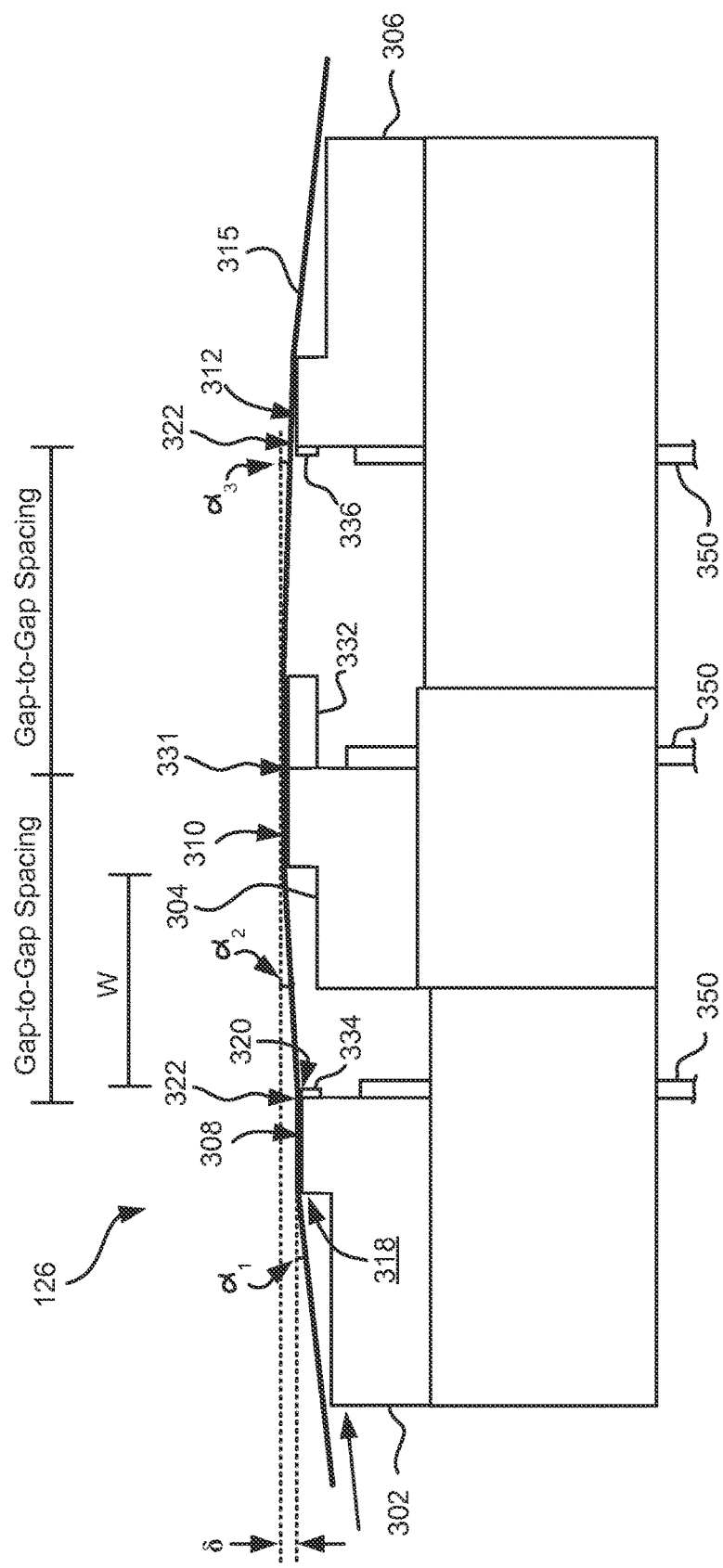
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
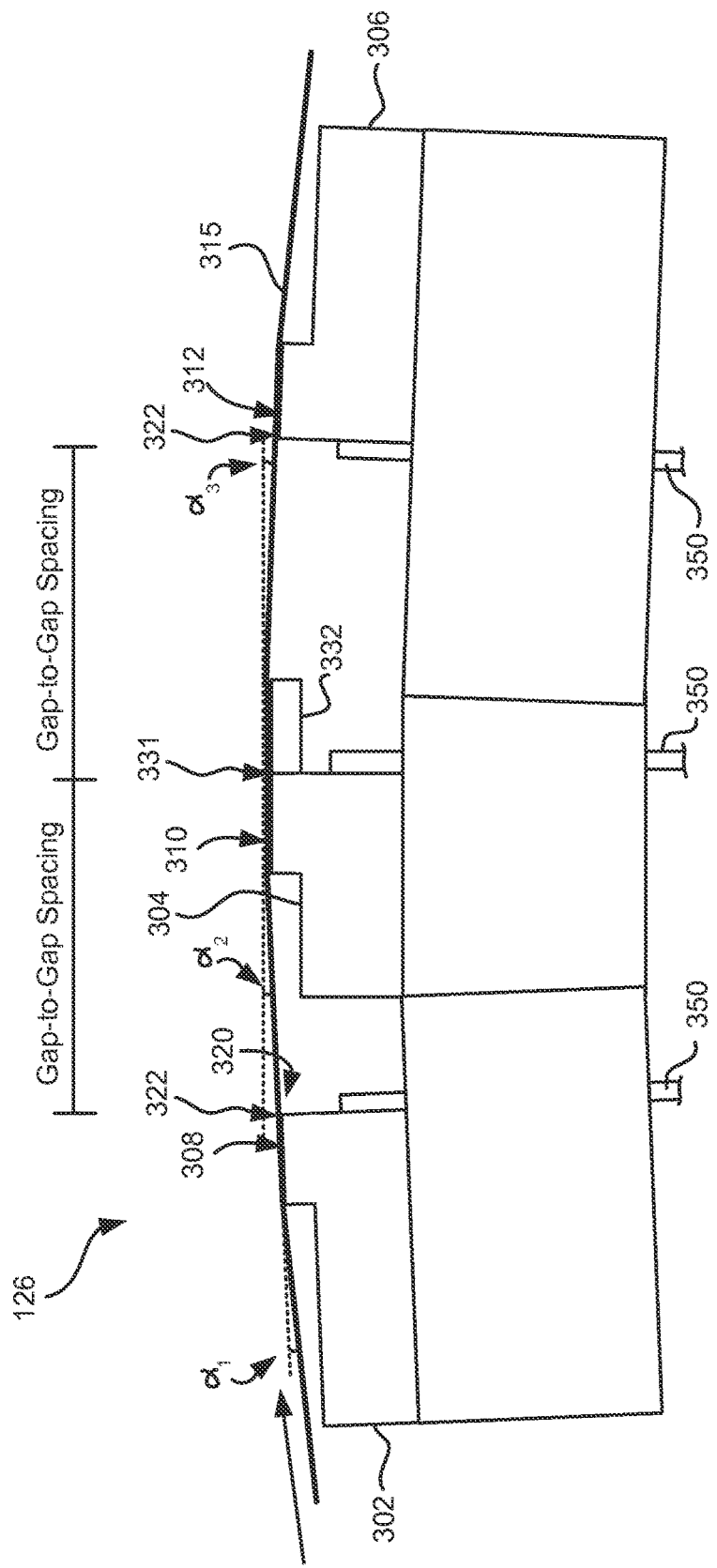
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle as on the trailing edge, as the tape 315 rides above the trailing module 306. This difference is generally beneficial as a smaller a tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
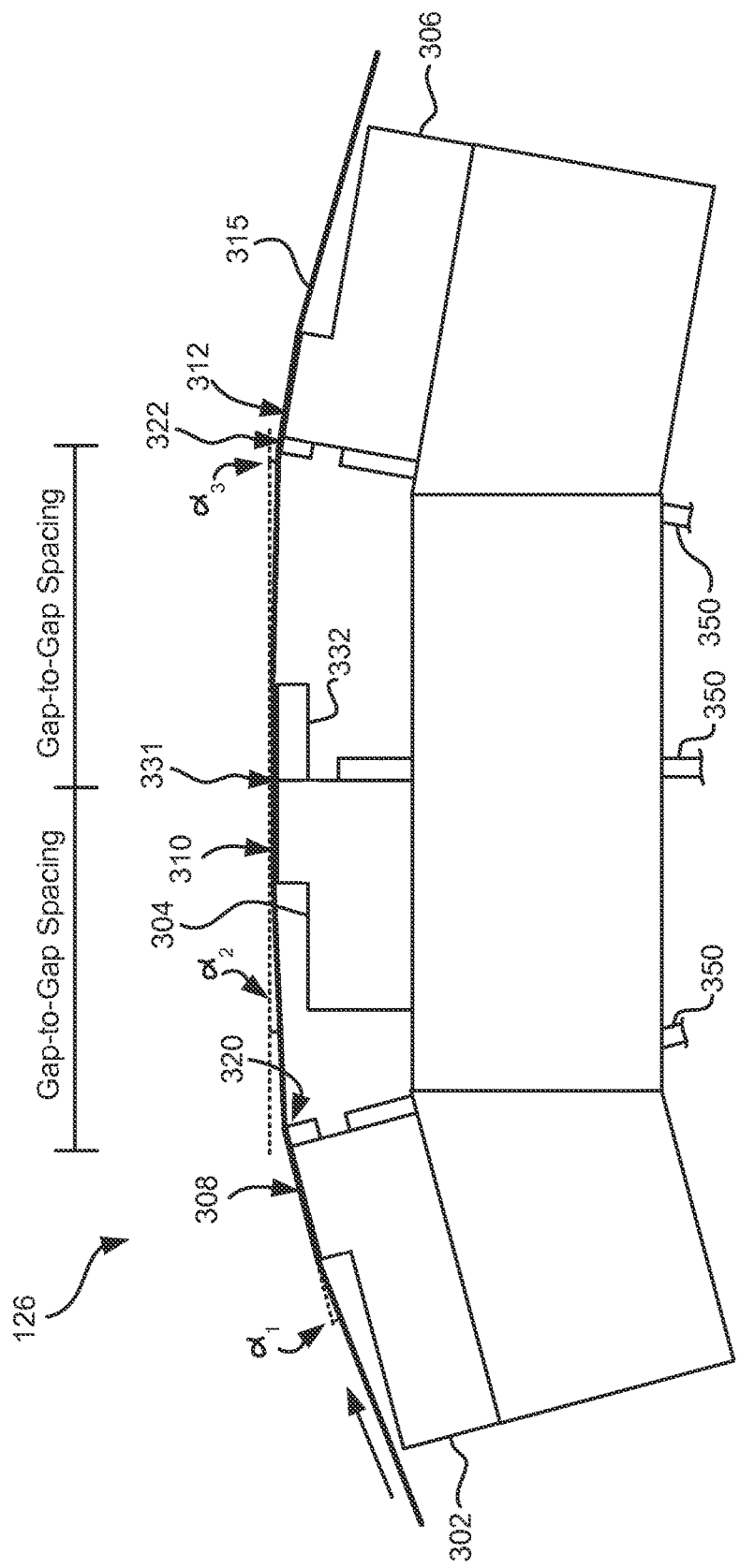
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Actuator assemblies according to various embodiments may have multiple degrees of freedom. Such actuators may be able to selectively adjust the orientation and/or position of a magnetic head with respect to a magnetic medium during operation thereof, and thereby may be able to compensate for various operational conditions, e.g., tape skew, tape shifting, etc. Accordingly, actuator assembly components may generate heat as a result of electrical current being used to position the actuator assembly about multiple degrees of freedom. As components of the actuator assembly heat up, the resistance of the actuator coils increase, which may as a result take more electrical current to skew the head to the same angular displacement than when the coils were cool.

Actuator assemblies having multiple degrees of freedom may experience overheating during operation. Overheating may lead to a degradation of readback quality and/or inhibit track following performance, and may ultimately lead to actuator failure.

Various embodiments described herein include preventative actions in response to determining, via one or more comparisons, that an actuator assembly is overheating.

Figure 8B:
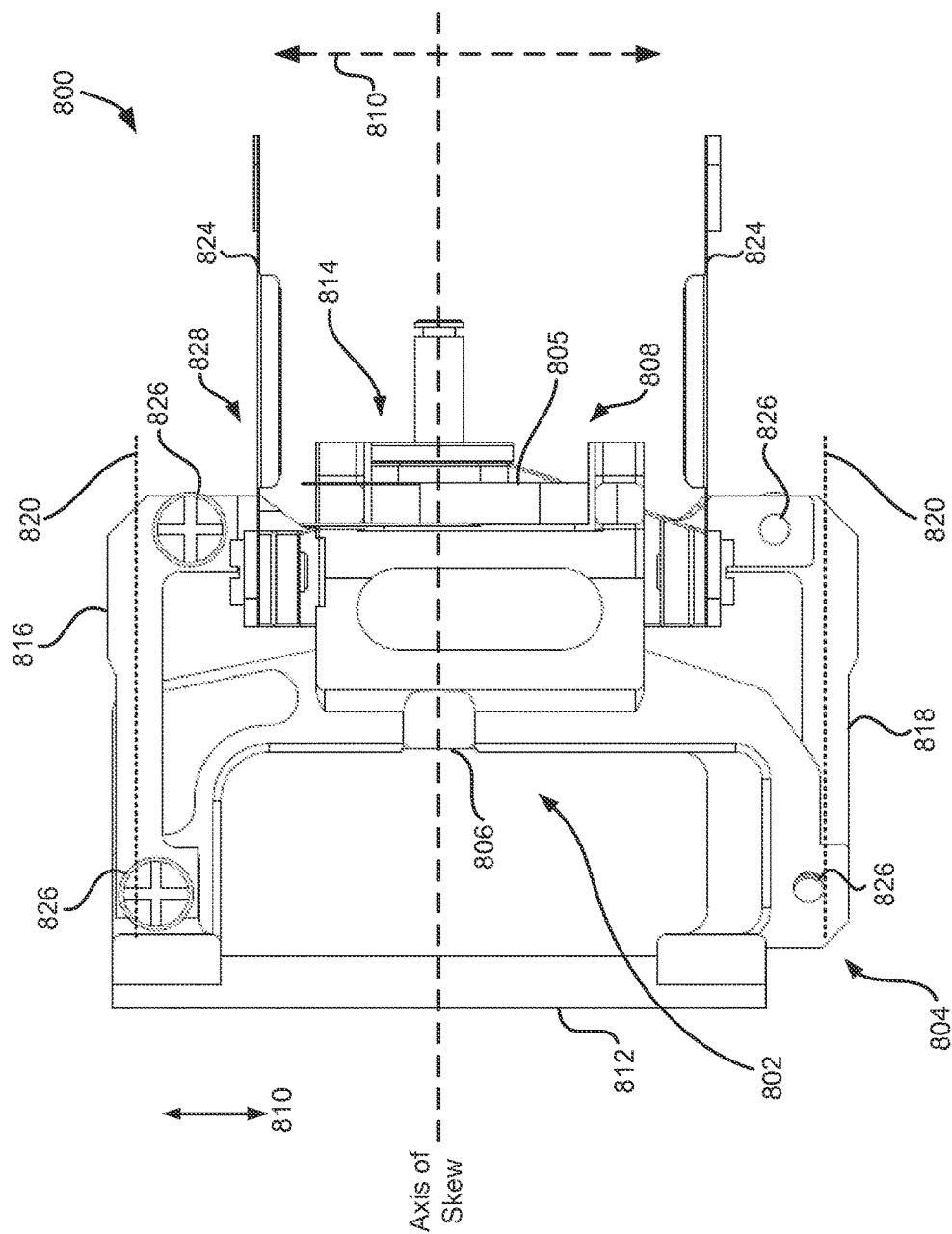
FIG. 8B is a side view of the apparatus from FIG. 8A taken along line 8B-SB of FIG. 8A.
Figure 8C:
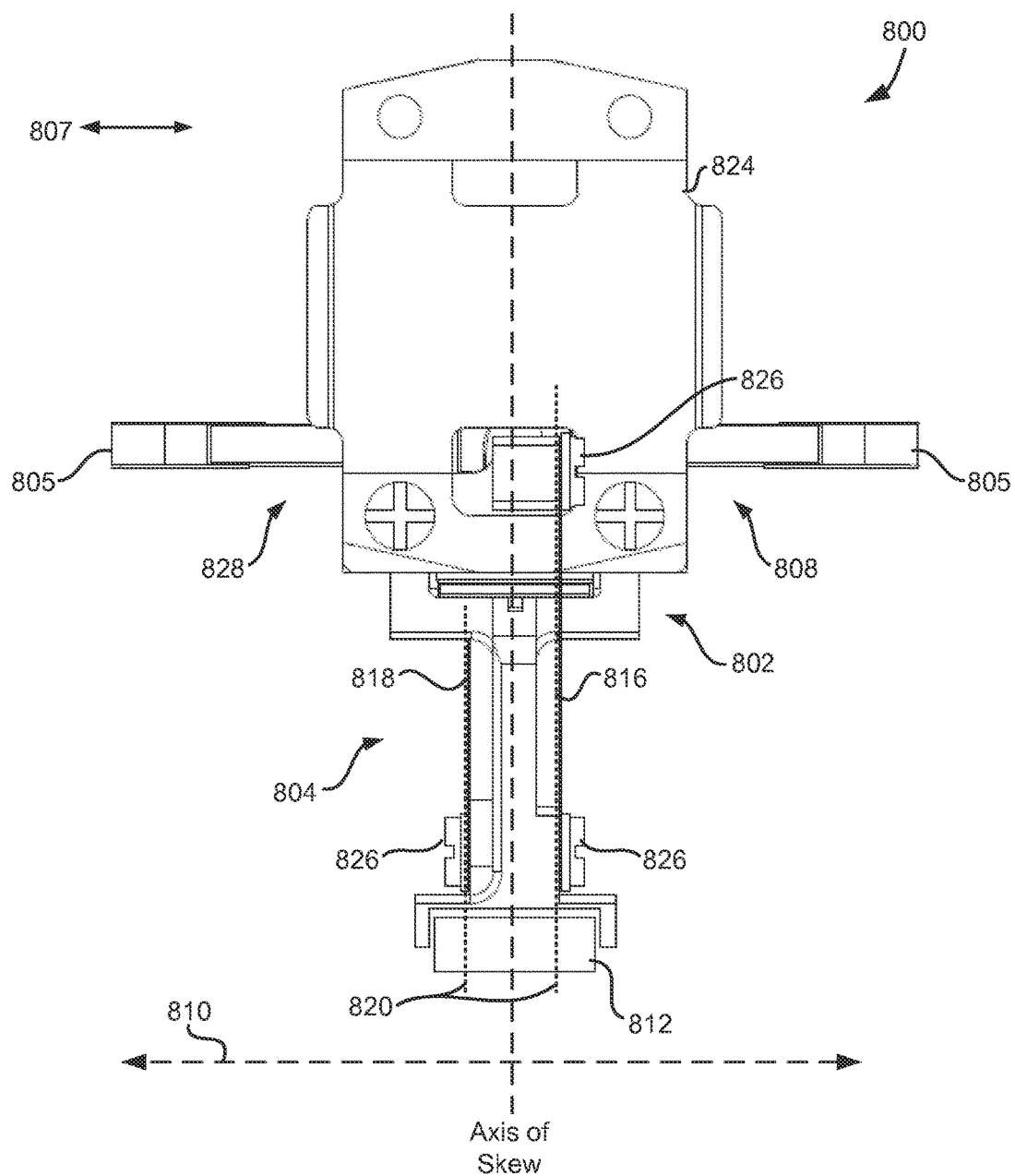
FIG. 8C is a top-down view of the apparatus from FIG. 8A taken along line 8C-8C of FIG. 8A.

FIGS. 8A-8C depict an apparatus 800, in accordance with one embodiment. As an option, the present apparatus 800 may be implemented in conjunction with features from any other embodiment listed herein, such as those described with reference to the other FIGS., such as FIGS. 1A-7. However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8C (and the other FIGS.) may be deemed to include any possible permutation.

Referring now to FIGS. 8A-8C, the apparatus 800 includes a pivot assembly 802 which is coupled to a head carriage assembly 804. The pivot assembly 802 is preferably coupled to the head carriage assembly 804 such that the pivot assembly 802 pivotably supports the head carriage assembly 804 and head module 812, e.g., via a pivot pin 806. The pivot pin 806 may implement a bushing-pin configuration, as would be appreciated by one skilled in the art upon reading the present description.

Accordingly the head carriage assembly 804 may be able to rotate about an axis of skew, which is illustrated as extending through about the axis of the pivot pin 806. Specifically, the axis of skew extends perpendicular to a plane defined by an intended direction of media movement 807 across the head carriage assembly 804 and a fine motion direction 810 of the head carriage assembly 804. The direction of fine motion (fine motion direction 810) is oriented about perpendicular to the intended direction of media movement 807 such that a position of the head carriage assembly 804 relative to the data tracks of a magnetic tape being passed thereover may be adjusted as desired, e.g., to compensate for shifting of the tape during operation.

Apparatus 800 additionally includes a motor 808 coupled to the head carriage assembly 804 which may be used to rotatably position the head carriage assembly 804 about the axis of skew. Thus, the motor 808 may be used to selectively rotate the head carriage assembly 804 about the axis of skew, thereby inducing a relative motion between the head carriage assembly 804 and the linear assembly 814 (described below). This ability to selectively rotate the head carriage assembly 804 about the axis of skew allows for the apparatus 800 to compensate (may herein be more generally referred to as "skew following") for tape skew experienced during operation, e.g., while tape is being passed over the head module 812. Skew following may ensure that the head remains perpendicular to the tape to ensure proper reading and writing functions.

According to various embodiments, skew following embodiments described herein may be particularly advantageous in tape drive actuator apparatuses with a flangeless tape path.

It should be noted that apparatus 800 also includes a second motor 828 coupled to the head carriage assembly 804 which may be used to position the head carriage assembly 804 in the fine motion direction 810 during operation, e.g., while tape is being passed over the head module 812. Accordingly, apparatus 800 includes a linear assembly 814 which is configured to move along the fine motion direction 810. Fine motion flexure 824 ensures that the linear assembly 814 travels in the fine motion direction 810 by restricting motion in alternate directions, e.g., along the direction of tape travel 807.

The linear assembly 814 may additionally support the pivot pin 806. Thus, the motor 808 may be used to selectively position the head carriage assembly 804 in the fine motion direction 810 as desired. Moreover, the linear assembly 814 is preferably coupled to the head carriage assembly 804 (e.g., via pivot pin 806) such that the linear assembly 814 carries along the head carriage assembly 804 during movement in the fine motion direction 810 (described in further detail below). Accordingly, the motor 808 may enable the apparatus 800 to perform track following in addition to skew compensation during operation, preferably such that tape shifting may be overcome while reading from and/or writing to tape being passed over the head module 812.

According to an example, which is in no way intended to limit the invention, the motors 808, 828 may preferably be electromagnetic motors, e.g., such as Lorentz force motors, voice coil motors, etc. As will be appreciated by one skilled in the art upon reading the description, movement may be induced upon applying an electrical current to each of the coils 805 of the electromagnetic motor. Thus, appropriate selection of the current to apply to each of the coils 805 of the electromagnetic motors 808, 828 may induce a movement of the head carriage assembly 804 about the axis of skew, e.g., for positioning the head carriage assembly relative to the intended direction of media movement 807. Moreover, appropriate selection of the current to apply to each of the coils 805 may induce a movement of the head carriage assembly 804 in the fine motion direction 810. e.g., for track following. It follows that the apparatus 800 may be selectively positioned both in the fine motion direction 810 and about the axis of skew.

Looking to the embodiment illustrated in FIGS. 8A-8C, the motors 808, 828 include two independently operable coils 805. The coils 805 are positioned relative to field generators 822 such that the force generated by currents passing through the coils 805 when energized controls the position of the assembly, as would be appreciated by one skilled in the art upon reading the present description. The illustrative field generators 822 shown have a plurality of hard magnets 823. As a result, the coils 805 of motors 808, 828 are capable of inducing movement in a common direction and/or in opposite directions by controlling the direction and magnitude of the current through each of the coils 805.

By using the coils 805 to induce movement in a common direction, the motor 808, 828 is able to cause the head carriage assembly 804 to translate linearly along the fine motion direction 810. Similarly, by using the coils 805 to induce movement in a single direction but in unequal amounts, or in opposite (e.g., antiparallel) directions, the motors 808, 828 are able to cause a rotation of the head carriage assembly 804 about the axis of rotation, e.g., at the pivot pin 806. Accordingly, current(s) may be applied to the coils 805 of motors 808, 828 in different combinations, in terms of magnitude and/or direction, to induce different movements of the head carriage assembly 804 and/or linear assembly 814.

It should be noted that although the motors 808, 828 are depicted in the present embodiment as being used to enable selective movement of the head carriage assembly 804 in the fine motion direction 810 as well as rotatably position the head carriage assembly 804 about the axis of skew, different types of motor configurations may be used to enable the respective movement in different embodiments. For example, according to alternative approaches, a single motor may be used to selectively move the head carriage assembly 804 in the fine motion direction 810 and additionally may be used to rotatably position the head carriage assembly 804 about the axis of skew.

Referring still to FIGS. 8A-8C, the linear assembly 814 is illustrated in the present embodiment as supporting the pivot assembly 802 and the head carriage assembly 804, e.g., by being coupled thereto via pivot pin 806 extending therebetween. Thus, as the linear assembly 814 moves along the fine motion direction 810, the pivot assembly 802 and the head carriage assembly 804 move as well. As previously mentioned, the linear assembly 814, the pivot assembly 802 and the head carriage assembly 804 effectively move as a single piece in the fine motion direction 810.

Additionally, first and second flexures 816, 818 extend between the head carriage assembly 804 and the linear assembly 814. Flexures 816, 818 as seen in FIGS. 8A-8C, or in accordance with any of the other embodiments described and/or suggested herein, are included to prevent an undesirable pitching motion from occurring during reading from and/or writing to a tape which may be traveling over the head module 812. Pitching motion occurs when at least a portion of the apparatus moves in a pivoting fashion about an axis of the apparatus oriented along direction 807.

Pitching may occur as a result of the pivot pin 806 serving as the only component coupling the head carriage assembly 804 and the remainder of the apparatus 800, e.g., the linear assembly 814. Various attempts to redesign the pivot pin 806 itself to overcome this pitching motion proved to be unrealistic, e.g., due to spatial constraints in the apparatus 800. However, by implementing the flexures 816, 818 as disclosed herein, the pitching motion, which again is undesirable for head track following performance, is attenuated, as will be described in further detail below. As a result, the bandwidth potential of the apparatus 800 is increased, because of the resulting better track following performance achieved when pitching is attenuated.

The longitudinal axes 820 of the flexures 816, 818 extend from the head carriage assembly 804 to the linear assembly 814 in a direction generally parallel to the axis of skew, e.g., within about 15 degrees from being parallel with the axis of skew. First ends of the flexures 816, 818 are preferably coupled to the head carriage assembly 804 while second ends of the flexures 816, 818 are coupled to the linear assembly 814. It should be noted that the term "ends" is in no way intended to limit the invention. According to alternate approaches, portions of the first and/or second flexures 816, 818 may extend beyond the points of contact with the head carriage assembly 804 and/or the linear assembly 814, e.g., depending on available space. Moreover, although the flexures 816, 818 are illustrated in the present embodiment as being coupled to the head carriage assembly 804 and the linear assembly 814 using bolts 826, the flexures 816, 818 may be coupled to the head carriage assembly 804 and/or the linear assembly 814 using any of the approaches described below.

As described above, it is preferred that the motor 808 is able to rotatably position the head carriage assembly 804 about the axis of skew. Thus, although the head carriage assembly 804 and the linear assembly 814 are coupled together by the flexures 816, 818, the ability to selectively rotate the head carriage assembly 804 about the axis of skew is preserved. Accordingly, the flexures 816, 818 are preferably able to permit the rotatable positioning of the head carriage assembly 804 about the axis of skew.

With continued reference to FIGS. 8A-8C, heat may be generated, e.g., in the coils 805, in and/or around apparatus 800, in motors 808, 828, etc., as electrical current is passed through the coils 805 of the electromagnetic motors 808, 828.

As noted above, the temperature of the coil may exceed a safe operating limit, e.g., as when in use in a warm environment, when higher than normal amounts of current are being passed through the coil, etc. Overheating may result in degradation, failure to properly track-follow, etc. Various embodiments estimate the state of the coil bulk temperature by using the servo system to measure the skew functional gain and compare the instantaneous skew functional gain to a reference gain, and take some action in response thereto, such as stopping the system to prevent failure. The skew functional gain changes with changes in the coil resistance due to increased coil temperature. Accordingly, the relationship between the current passing through the coils and the corresponding temperature can be mapped.

Generally, with an actuator system described herein, the primary function is to track follow and then enable the skew following function. It is necessary to track follow during operation of the drive, but it is possible to temporarily disable or override the skew following function. It may not be generally feasible to perform the skew following function without the track following function, and therefore the ability to separately use the skew following function allows for the coil temperature to be estimated in some approaches.

In various embodiments, the coil electrical circuits used to operate the coils may supply a constant amount of current when commanded to operate at any commanded level regardless of the coil resistance. In other words, the electrical current supply circuit may adjust the supply voltage to ensure that the current passing through the coil is at the commanded level from the servo system.

It should be noted that if the ability to know the resistance across the coil terminals was present, the coil temperature could be more easily estimated, but this scheme would require extra circuitry. Various embodiments do not have such extra circuitry, but rather estimate the bulk coil temperature without knowledge of the coil resistance. The bulk coil temperature may be an average temperature, but it should be understood that some windings in the coil pack can be hotter and some can be cooler, so when establishing margins this should be taken into account.

The estimation of the coil temperature may use a relationship between temperature of the coil and current passing through the coil. This relationship may be determined outside the tape drive and prior to field use of the tape drive and/or tape actuator.

The relationship between temperature of the coil and current passing through the coil may include a correlation mapping the increase in coil temperature corresponding to an increase in current passing through the coils. As previously described, the resistance of the actuator coils may increase as a result of heating up during operation. This increase in resistance may in turn causes the system to apply more electrical current to skew the head to the same angular displacement than when the coils were cool.

Figure 9:
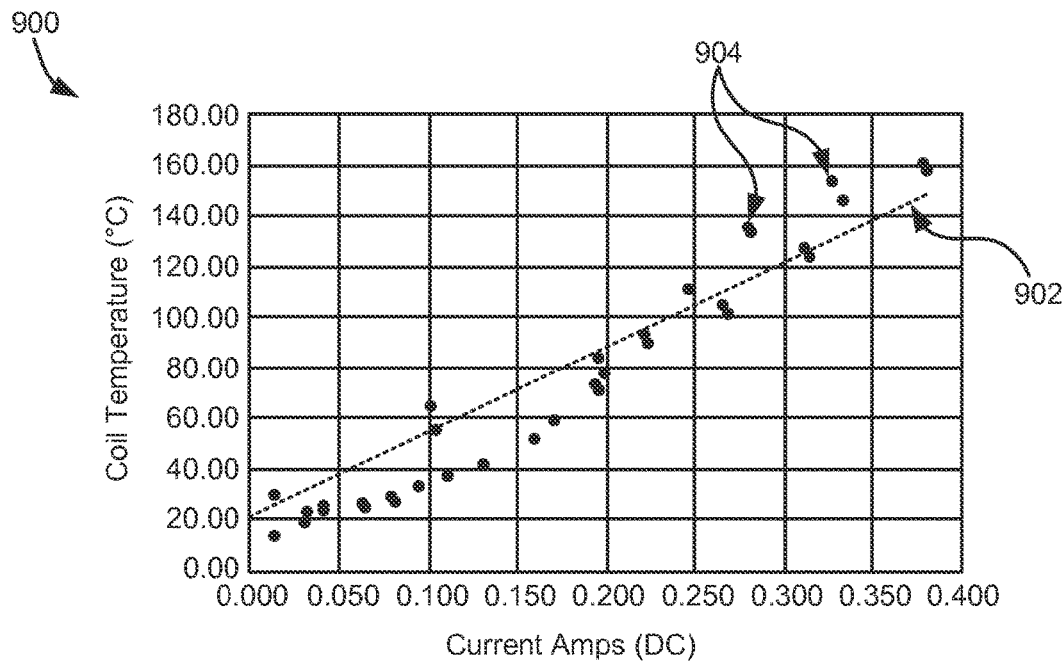
FIG. 9 is a graph depicting the comparative coil temperature vs. current for the apparatus according to one embodiment.

An example of an established relationship between temperature of the coil and current passing through the coil is shown in FIG. 9.

FIG. 9 depicts a comparative plot 900, in accordance with one embodiment. As an option, the present comparative plot 900 may be implemented in conjunction with features from any other embodiment listed herein, such as those described with reference to the other FIGS., such as FIGS. 1A-8C. However, such comparative plot 900 and others presented herein may be used in various applications and/or in permutations which may or may not be specifically described in the illustrative embodiments listed herein. Further, the comparative plot 900 presented herein may be used in any desired environment. Thus FIG. 9 (and the other FIGS.) may be deemed to include any possible permutation.

FIG. 9 is an illustrative coil temperature (° C.) versus current (Amps of direct current "DC") comparative plot 900. Plot 900 includes plot points 904, which provide reference data of how specific coil temperatures correlate with specific currents being applied to the coils 805, in this example. Such data may be obtained via experimentation with the subject drive at known operating parameters, ideally parameters that the drive is expected to encounter in use.

A linear regression, represented by line 902, may provide a best fit linear correlation of the plot points 904 for reference. According to various embodiments, the linear equation derived from the data in plot 900 may be used to calculate an estimation of the temperature of the coil 805 for any current level passing through the coil 805. In this example, the illustrative linear regression line 902 in plot 900 may correspond to a linear equation of: Coil Temperature=333.79*Current Amps+21.304.

Figure 10:
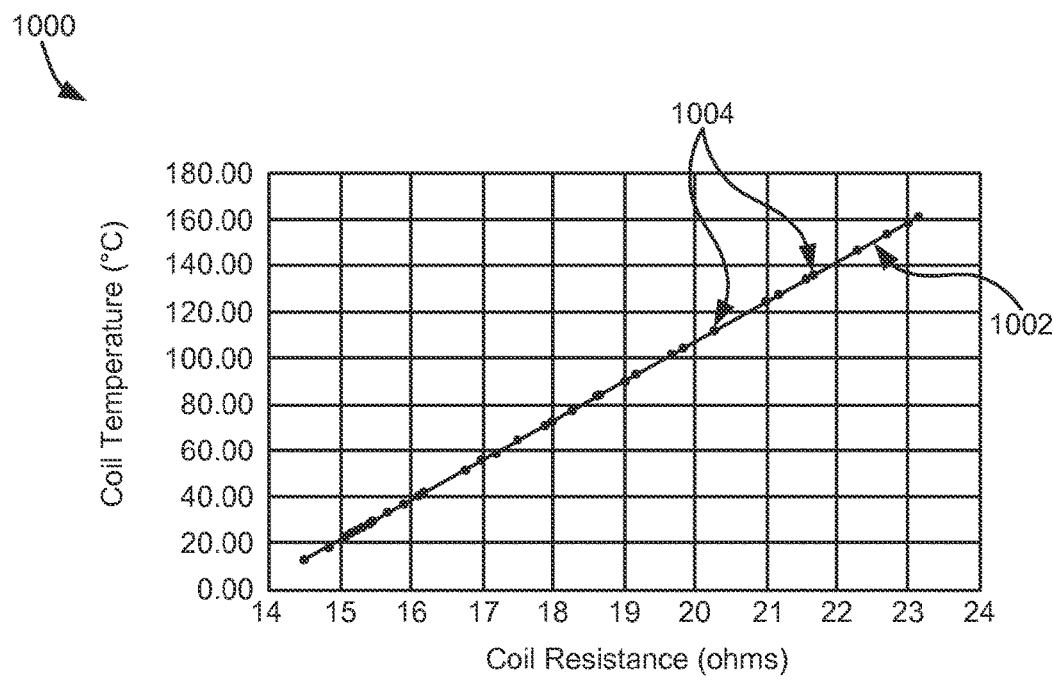
FIG. 10 is a graph depicting the comparative coil temperature vs. coil resistance for the apparatus according to one embodiment.

A relationship between coil resistance and temperature may be determined using the established properties for the type of conductor used in the coil, generally available in materials books. Referring to FIG. 10, an illustrative comparison of the relationship between the resistance of the coils and the corresponding temperature of the coils is shown.

FIG. 10 depicts a comparative plot 1000, in accordance with one embodiment. As an option, the present comparative plot 1000 may be implemented in conjunction with features from any other embodiment listed herein, such as those described with reference to the other FIGS., such as FIGS. 1A-8C. However, such comparative plot 1000 and others presented herein may be used in various applications and/or in permutations which may or may not be specifically described in the illustrative embodiments listed herein. Further, the comparative plot 1000 presented herein may be used in any desired environment. Thus FIG. 10 (and the other FIGS.) may be deemed to include any possible permutation.

FIG. 10 is an illustrative coil temperature versus coil resistance comparative plot 1000. Plot 1000 includes plot points 1004, which may provide reference data of how specific coil temperatures correlate with coil resistances values that are determined based on one or more properties of the conductor of the coil, e.g., wire properties. Linear regression line 1002 may correspond to an equation for establishing coil temperature versus coil resistance relationships. In this specific example, the linear regression line 1002 in plot 1000 has a linear equation of: Coil Temperature=17.095*Coil Resistance−234.38.

It should be noted that the "Coil Resistance" usable to generate the linear equation and/or of various embodiments described herein, may be determined based on one or more wire properties, rather than determined based on one or more measurements of the actual coil resistance. According to various embodiments, no circuitry to determine a resistance across the coil may be present in the controller and/or anywhere else in the apparatus 800. Accordingly, an individual and/or a bulk coil temperature, e.g. "Coil Temperature" of FIG. 10, may be determined without using a coil resistance value and/or derivative thereof.

The correlations and/or calculated values described herein, particularly with reference to those represented by FIGS. 9 and 10, may be calculated only one time for a given drive, and in a production environment, one time for the particular actuator design. For example, because high volume production of actuator system parts generally leads to actuators having substantially similar designs and/or performances, the relationships described in FIGS. 9-10 may be established once and applied to all actuators of the same type.

Illustrative parameters of the coils that may be used to determine these relationships include, e.g., the outer diameter of the coil, the packing dimensions of the coil, the length of wire of the coil, etc.

It should be noted that coil temperature versus coil resistance behavior may vary depending on the embodiment and/or the coil design. Accordingly, correlations and/or calculated values described herein may be calculated more than one time, e.g., calculated for each differing coil design, calculated for every individual apparatus 800, calculated at the discretion of a user, etc.

In addition to the relationships established in FIGS. 9-10, a stored reference gain (may herein be referred to as "G_ref") may be established for one or more components of the actuator system. The relationships established in FIGS. 9-10 and the stored G_ref may provide one or more reference thermal relationships and/or values that may be compared to the one or more thermal relationships and/or values of the actuator determined during operation, e.g., to take some action such as to prevent temperature damage of a tape drive actuator, as will be described elsewhere herein.

Calculations of the G_ref values may be performed by operating the skew following function of the apparatus to various skew reference values during operation of the tape drive system, e.g. system 100, in a controlled environment. G_ref values may be stored, e.g., on the main logic card memory as a permanent or modifiable setting, on a sub-logic card, on any storage device of a type known in the art, etc.

In calculating the G_ref value, the reference values may be stepped from negative values to positive values for illustrative purposes (see FIG. 1), rather than just setting a reference value to "0". Stepping the reference values through negative values to positive values provides a G_ref of the electromagnetic motor that enables the skew function of the actuator assembly.

Figure 11:
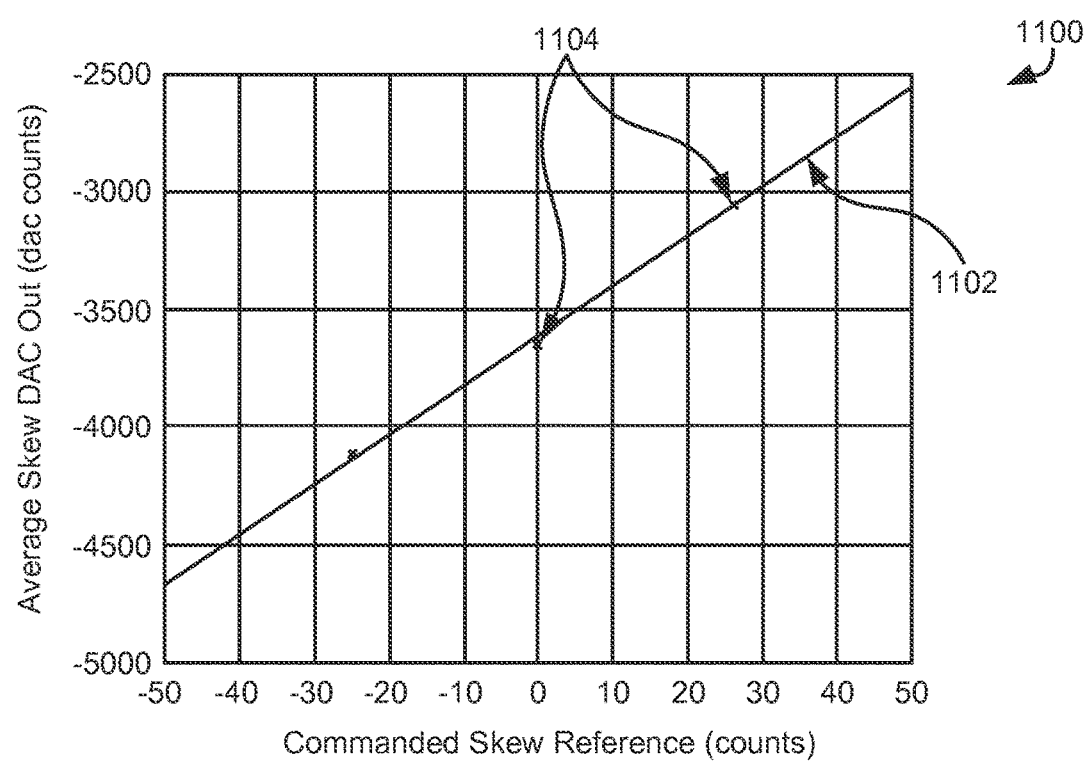
FIG. 11 is a graph depicting the comparative average skew digitalized amps current (DAC) output vs. commanded skew reference for the apparatus according to one embodiment.

Referring to FIG. 11, an example of determining the G_ref value will now be detailed below.

FIG. 11 depicts a comparative plot 1100, in accordance with one embodiment. As an option, the present comparative plot 1100 may be implemented in conjunction with features from any other embodiment listed herein, such as those described with reference to the other FIGS., such as FIGS. 1A-8C. However, such comparative plot 1100 and others presented herein may be used in various applications and/or in permutations which may or may not be specifically described in the illustrative embodiments listed herein.

Further, the comparative plot 1100 presented herein may be used in any desired environment. Thus FIG. 11 (and the other FIGS.) may be deemed to include any possible permutation.

FIG. 11 is an illustrative average skew DAC output versus commanded skew reference comparative plot 1100. Plot 1100 includes plot points 1104, which may provide reference data of how specific average skew DAC outputs correlate with specific commanded skews. Line 1102 may provide a linear correlation of the plot points 1104 for reference.

The determined G_ref value may establish a reference gain, e.g., a ratio of the output current (amps) to the skew reference angle (radians). In the example shown, the G_ref value of plot 1100 was determined using linear algebra to be about 21.453 digitized amps per digitized radians.

When the coils warm, as can occur during operation of the tape drive, additional skew gain measurements may be made to determine the skew gain (G_test). This can be done, for example at turn around at the end of tape, or actual operation, when the skew reference values used are within the drive operational specifications. By commanding the skew following system to operate at a non-zero reference value and by recording the current driven to the coils, which may be known by the servo system at any time, a best fit, or average slope for each measurement point may then be calculated to establish a skew gain (may herein be referred to as "G_test") value. Known mathematical techniques may be used.

The G_test value may be compared to the G_ref value to ensure that one or more components, e.g., the coils, of the tape drive are not operating at dangerous temperatures. A preferred method which includes the calculation of the G_test value and the comparison between the stored G_ref value and the calculated G_test value will now be described below.

Figure 12:
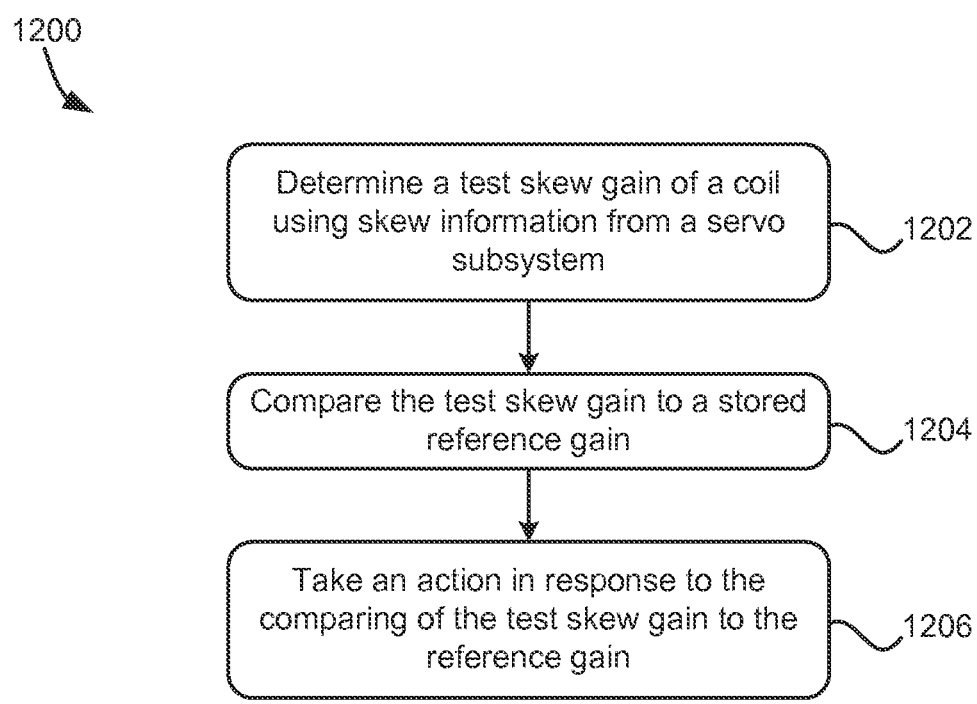
FIG. 12 is a flowchart of a method according to one embodiment.

FIG. 12 shows a method 1200 for preventing temperature damage of a tape drive actuator, in accordance with one embodiment. As an option, the present method 1200 may be implemented to prevent temperature damage of a tape drive actuator such as those shown in the other FIGS. described herein. Of course, however, this method 1200 and others presented herein may be used to form structures for a wide variety of devices and/or purposes, provide applications which may or may not be related to the illustrative embodiments listed herein. Further, the methods presented herein may be carried out in any desired environment. Moreover, more or less operations than those shown in FIG. 12 may be included in method 1200, according to various embodiments. It should also be noted that any of the aforementioned features may be used in any of the embodiments described in accordance with the various methods.

Operation 1202 includes determining the G_test of a coil, or equivalently, a plurality of coils, using skew information from a servo subsystem. The G_test may be compared to a stored reference value to determine if the servo system is operating at a safe/non-damaging temperature, as will be described elsewhere herein.

According to various embodiments, G_test may be determined prior to operation of the coil.

According to further embodiments, G_test may be determined after a period of operation of the coil. For example, G_test may be determined by recording the current being driven to the coils after the skew following system is commanded to operate at a non-zero reference value. The G_test value may be determined based on the current driven to the coils in real time by acquiring the current level from the servo system.

Figure 13:
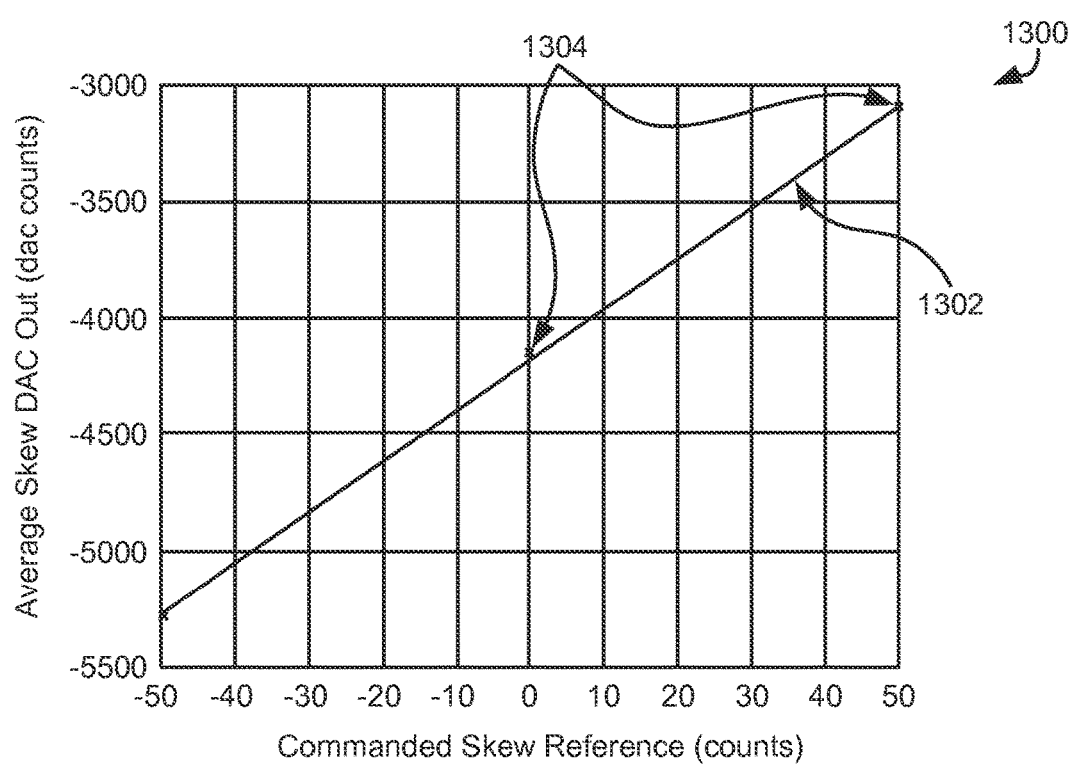
FIG. 13 is a graph depicting the comparative average skew DAC output vs. commanded skew reference for the apparatus according to one embodiment.

Referring momentarily to FIG. 13, an example of determining the G_test value while the actuator coils are warm, e.g., during operation of the tape drive, will now be detailed.

FIG. 13 depicts a comparative plot 1300, in accordance with one embodiment. As an option, the present comparative plot 1300 may be implemented in conjunction with features from any other embodiment listed herein, such as those described with reference to the other FIGS., such as FIGS. 1A-8C. However, such comparative plot 1300 and others presented herein may be used in various applications and/or in permutations which may or may not be specifically described in the illustrative embodiments listed herein. Further, the comparative plot 1300 presented herein may be used in any desired environment. Thus FIG. 13 (and the other FIGS.) may be deemed to include any possible permutation.

FIG. 13 is an illustrative average skew DAC output versus commanded skew reference comparative plot 1300. Plot 1300 includes measurement points (may be herein referred to as "plot points 1304"), which provide reference data of how specific average skew DAC outputs correlate with specific commanded skews. This correlation may be dependent upon the supply voltage supplied by the electrical current supply circuit as it attempts to ensure that the current passing through wire of the coils is a commanded level, e.g., as commanded by the servo system to compensate for tape skew.

Line 1302 provides a representative linear correlation of the plot points 1304 for reference. As described above, by commanding the skew following system to operate at a non-zero reference value and by recording the current driven to the coils, which current level is known by the servo system at any time, a best fit, or average slope for each plot point 1304 may then be calculated to establish the G_test value.

According to various embodiments, the G_test value may be determined instantaneously. For example, the G_test value may be instantaneously determined during read or write function of the tape drive, e.g. without stopping the tape. According to further embodiments, the G_test value may be determined by averaging any number of plot points 1304 over a period of time that is greater than instantaneously, e.g. by stopping the tape drive functionality more than one time, and calculating the G_test.

For purposes of an example, the G_test value of plot 1300 was determined to be 21.8842 digitized amps per digitized radians.

Referring again to FIG. 12, operation 1204 of method 1200 includes comparing the G_test to the stored G_ref. Comparing the G_test to the stored G_ref may be performed to determine if the components of the actuator system, e.g. the coils of apparatus 800, are operating at a dangerous and/or damaging temperature.

According to further embodiments, the G_test may be compared to the stored G_ref for determining whether a temperature of the coil is elevated, e.g., above a predefined safe operating temperature, some predefined threshold, etc.

Comparing the G_test to the stored G_ref may be performed using, e.g., a simple comparison, generation of a ratio, a comparative method known in the art, etc.

It may be observed that at the warm coil condition, e.g. during operation of the tape drive, the G_test value (G_test=22.239 in this example) is higher than the stored G_ref value (G_ref=21.453) which was determined and stored in the cool condition, e.g. before operation and/or assembly of apparatus 800. This is due to the actuator system, e.g., the coils 805 of apparatus 800, needing more current to achieve the same angular motion during warm conditions, than would be needed during cool conditions. This may be due to an increase in the resistance of the coil pack. The increase in the resistance of the coil pack may occur in response to the coil pack being warmer than when G_ref was calculated.

The G_test and G_ref values (determined above) may then be compared to calculate the ratio of G_test/G_ref, or 22.239/21.453=1.0366. This ratio may represent an approximately 3.7% increase in the coil resistance and may furthermore represent a proportional increase in the coil temperature. In embodiments where no circuitry is used to determine a resistance across the coil, and such circuitry may not even be present in the controller and/or anywhere else in the apparatus 800, this determination is made without using knowledge of the exact instantaneous resistance of the coil itself. The reference resistance and temperature may then be utilized in making a determination that the bulk coil temperature is acceptable or not.

Operation 1206 includes taking an action in response to the comparing of the test skew gain to the reference gain. For example, criteria can be set for gain changes that are above a threshold or in some predefined range in order to protect the coil.

In some embodiments, when the G_test value is found, e.g., based on the comparison performed in operation 1204, to be a determined amount smaller than or equal to the G_ref value, an action may be performed, e.g. additional comparisons of G_test and G_ref values may be performed after a predetermined amount of time, the operating currents may be stored as safe operational currents for the coils of apparatus 800 on the main logic card memory, a non-altering functional action of a type known in the art, etc. Non-altering functional actions of operation 1206 may preferably be performed in response to the servo system, e.g., apparatus 800, being determined to be operating at a safe and/or non-damaging temperature.

In some embodiments, when the G_test value is found, e.g., based on the comparison performed in operation 1204, to be a determined amount greater than the G_ref value, an action may be performed, e.g. the data storage device may be stopped; the operating current, e.g. the current passing through coils 805, may be decreased to a stored safe operating current; a cooling action may be initiated; etc. Actions taken in response to determining that the G_test value is a determined amount greater than the G_ref value, may decrease the temperatures of the coils and/or one or more other heated components in the actuator system.

The G_test value being at least a determined amount greater than the G_ref value may correlate to the servo system, e.g., apparatus 800 and/or the entire data storage device operating at a damaging current level and/or damaging temperature level, e.g., a current and/or temperature level that would permanently physically deform the general pack shape of the coils 805; a current and/or temperature level that would cause rubbing and/or friction in stationary components, e.g., the face of a magnet within the actuator assembly; a current and/or temperature level that would soften the insulation and/or coil adhesives of apparatus 800; being in danger of some other thermal damage or degradation; etc.

Further operations may include calculating an estimated temperature of the coil. The estimated temperature of the coil may be calculated by estimating the coil resistance and correlating the resistance to a temperature. According to various embodiments, no circuitry to determine an actual resistance across the coil may be present in the controller and/or anywhere else in the apparatus 800. Accordingly, the estimated temperature of the coil is determined without using a coil resistance value and/or derivative thereof.

An example of estimating the temperature of the coil will now be described by the below.

It should be noted that the example below includes illustrative values of the plots and/or examples described above. Accordingly, calculations of the present example may be performed with calibration being conducted under controlled environmental conditions.

With a G_ref value determined with a coil temperature of 20° C., using the relationship between a skew gain change correlating to a change in the resistance of the coils, plot 1000 of FIG. 10 may be used to calculate an estimated resistance value of 14.88 ohms when the coil temperature is at 20° C. The warm coil resistance may then be calculated by multiplying the estimated resistance value when the coil temperature is at 20° C. with the G_test/G_ref ratio value, to be 1.0366*14.88 ohms=15.425 ohms.

Using the linear equation of FIG. 10, and the estimated resistance value, an estimated temperature of the coil may be calculated to be: Estimated Coil Temperature=17.095*15.425−234.38=29.31° C. A 29.31° C. estimated coil temperature may equate to about a 9.3 degree increase in the coil temperature relative to the temperature when G_ref was determined.

The estimated temperature may preferably be compared to a predetermined threshold to determine if the estimated temperature is above the threshold. If the estimated temperature is determined to be greater than the threshold, e.g., the coils of the actuator are operating at too high of a temperature, an action may be performed which may include stopping the data storage device.

Alternatively, if the estimated temperature is determined to be less than or equal to a determined threshold, e.g., the coils of the actuator are operating at an acceptable temperature, a non-altering action may be performed. For example, in response to determining that the estimated temperature is less than or equal to a determined threshold, the estimated temperature may again be recalculated at a future time, e.g., after a subsequent period of apparatus 800 operation.

An estimated coil temperature and/or the corresponding increase and/or decrease in the coil temperature may be evaluated, e.g., via established comparisons, to determine if actions should be performed. For example, an action may include shutting down the actuator system to cool the coils, when it is determined that estimated coil temperature is too high.

Because design components of the apparatus, e.g., the magnets, the driving circuitry, apparatus components of a type known in the art may remain substantially unchanged, the change in the operational skew gain value may be due to increases or decreases in the resistance of the coil wire. Accordingly, the increase in the resistance of the wire may be due to an increase in the coil bulk temperature. Accordingly, by measuring G_test at predefined intervals of tape drive functionality, and comparing the measurement to G_ref measured under controlled environmental conditions, the change in the skew gain may vary depending on the coil bulk temperature. According to various embodiments, this behavior can be used to monitor the bulk coil temperature, and furthermore perform an action upon determining that the bulk coil temperature is undesirable and/or damages design functionally.

U.S. Pat. No. 8,035,926, which discloses an exemplary tape storage system that can be modified to operate as described herein, is incorporated by reference The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product, the computer program product comprising a computer readable storage medium having program instructions embodied therewith, the program instructions executable by a controller of a data storage device to cause the controller to perform a method comprising:
   determining, by the controller, a test skew gain of a coil using skew information from a servo subsystem of the controller;
   comparing, by the controller, the test skew gain to a stored reference gain; and
   taking an action, by the controller, in response to the comparing of the test skew gain to the reference gain.

2. The computer program product as recited in claim 1, comprising program instructions executable by the controller to cause the controller to calculate an estimated temperature of the coil.

3. The computer program product as recited in claim 2, wherein the estimated temperature of the coil is calculated without using a coil resistance value and/or derivative thereof.

4. The computer program product as recited in claim 2, wherein the action includes stopping the data storage device in response to determining that the estimated temperature is above a threshold.

5. The computer program product as recited in claim 1, wherein no circuitry to determine a resistance across the coil is present in the controller.

6. The computer program product as recited in claim 1, comprising program instructions executable by the controller to cause the controller to determine the test skew gain prior to operation of the coil.

7. The computer program product as recited in claim 1, comprising program instructions executable by the controller to cause the controller to determine the test skew gain after a period of operation of the coil.

8. The computer program product as recited in claim 1, wherein the test skew gain is determined instantaneously.

9. The computer program product as recited in claim 1, wherein the action includes stopping the data storage device.

10. The computer program product as recited in claim 1, comprising program instructions executable by the controller to cause the controller to calculate an estimated coil resistance of the coil.

11. The computer program product as recited in claim 1, wherein the data storage device is a tape drive.

12. An apparatus, comprising:
    a controller configured to:
        determine, by the controller, a test skew gain of a coil using skew information from a servo subsystem thereof;
        compare, by the controller, the test skew gain to a stored reference gain; and
        take an action, by the controller, in response to the comparing of the test skew gain to the reference gain.

13. The apparatus as recited in claim 12, wherein the coil is an actuator coil, wherein no circuitry to determine a resistance across the coil is present in the controller.

14. The apparatus as recited in claim 12, wherein the controller is configured to determine the test skew gain after a period of operation of the coil, wherein the servo subsystem is configured to determine the skew information from information received from servo readers reading servo tracks positioned adjacent data tracks on a magnetic medium, wherein the controller is further configured to decode data received from data readers reading the data tracks while the servo subsystem is determining the skew information.

15. The apparatus as recited in claim 12, wherein the controller is configured to calculate an estimated temperature of the coil based on the comparing, wherein the action includes stopping the apparatus in response to the calculated estimated temperature indicating that the temperature of the coil is elevated.

16. The apparatus as recited in claim 12, comprising:
    a drive mechanism for passing a magnetic medium over a magnetic head, the magnetic head having an array of data readers coupled to the controller, the magnetic head having at least one servo reader coupled to the servo subsystem, the at least one servo reader being adjacent the array of data readers.

17. The apparatus as recited in claim 16, wherein the action includes stopping the drive mechanism.

18. A method, comprising:
    determining a test skew gain of a coil in a data storage device using skew information from a servo subsystem of a controller;
    comparing the test skew gain to a stored reference gain for determining whether a temperature of the coil is elevated; and
    stopping the data storage device in response to the comparing of the test skew gain to the reference gain indicating that the temperature of the coil is elevated.

19. The method as recited in claim 18, comprising calculating an estimated temperature of the coil.

20. The method as recited in claim 18, wherein no circuitry to determine a resistance across the coil is present in the controller.

* * * * *